(12) United States Patent
Marzec et al.

(10) Patent No.: US 6,238,029 B1
(45) Date of Patent: May 29, 2001

(54) UNIVERSAL ELECTRONICS CABINET (75) Inventors: Steven Jeffrey Marzec; Lyle James Ratner, both of Dallas, TX (US)

(73) Assignee: ADS, The Power Resource, Inc., Dallas, TX (US)

( * ) Notice: Subject to any disclaimer, the term of this patent is extended or adjusted under 35 U.S.C. 154(b) by 0 days.

(21) Appl. No.: 09/546,985

(22) Filed: Apr. 11, 2000

(51) Int. Cl.$^7$ ................................................. A47B 47/00
(52) U.S. Cl. ................................ 312/265.3; 312/265.5; 312/257.1; 211/26
(58) Field of Search ....................... 312/257.1, 263, 312/264, 265.1, 265.2, 265.3, 265.4, 265.5, 265.6, 111, 140; 211/26, 182, 189; 52/648.1, 653.1

(56) References Cited

U.S. PATENT DOCUMENTS

| | | | |
|---|---|---|---|
| 2,167,525 | * | 7/1939 | Rosendale ...................... 312/257.1 X |
| 3,075,818 | * | 1/1963 | Fay ...................................... 312/265.4 |
| 3,110,535 | * | 11/1963 | Anderson ....................... 312/265.5 X |
| 3,265,419 | * | 8/1966 | Durnbaugh et al. .......... 312/265.5 X |
| 5,806,945 | * | 9/1998 | Anderson et al. ................. 312/265.3 |
| 6,006,925 | | 12/1999 | Sevier ..................................... 211/26 |
| 6,164,737 | * | 12/2000 | Benner et al. ................. 312/265.5 X |

* cited by examiner

Primary Examiner—James O. Hansen (74) Attorney, Agent, or Firm—Howison, Chauza, Thoma, Handley & Arnott, L.L.P.

(57) ABSTRACT

An electronics cabinet (12) has a welded frame (46) formed of sections of metal sheet which define a top (14), a base (16) and four corner posts (18). Two of the sections of metal sheet are formed into a pan-like configurations to define the top (14) and the base (16). Four of the sections of meal sheet are formed to define the four corner posts (18), each having a long side (144) and a short side (146) which are perpendicular. The longer sides (144) of the corner posts (18) are aligned parallel to a depth of the cabinet (12). Lengths of the four corner posts (18) extend for the height of the cabinet (12), with end portions (78) of the corner posts (18) overlapping and fitting flush against the outer sides (62, 64) of respective ones of the corners (15, 17) of the top (14) and base (16). The top (14) and the base (16) have corner openings defined by apertures (80) and by slots (120) which extend through the sidewalls(62, 64) adjacent to end portions (78) of the corner posts (18) which overlap the top (14) and the base (16). The openings defined by the apertures (80) are plug welded to the corner post (18). Edges (162, 164) of the corner posts (18) and edges (116, 122) of the top (14) and base (16), which are interior of the cabinet (12), are fillet welded together. Four mounting rails (36) are aligned in parallel and welded to respective ones of the top (14) and base (16), two of the rails (36) mounted to the top (14) and two of the rails (36) mounted to the base (16). Two foot plates (44) are mounted to the underside of the base (16), spaced apart and perpendicular to lengths of the two mounting rails (36) mounted to the topside of the base (16).

23 Claims, 12 Drawing Sheets

```
202 — PUNCH TOP, BASE, CORNER POSTS, RACK POSTS,
      SIDEWALLS & DOORS OUT OF SHEET METAL
           ↓
204 — FORM TOP, BASE, CORNER POSTS, RACK POSTS, SIDEWALLS
      & DOORS OUT OF PUNCHED PIECES OF SHEET METAL
           ↓
206 — ASSEMBLE TOP, BASE AND CORNER POSTS,
      SECURING TOGETHER WITH ASSEMBLY JIGS
           ↓
208 — PLUG WELD CENTRAL PORTIONS OF TOP & BASE
      SIDEWALLS TO CORNER POSTS
           ↓
210 — FILLET WELD EDGES OF BASE & TOP
      OF SIDEWALLS TO CORNER POSTS
           ↓
212 — WELD MOUNTING RAILS TO TOP & BASE,
      ALIGNED IN PARALLEL
           ↓
214 — WELD FOOT PLATES TO UNDERSIDE OF BASE
           ↓
215 — WELD STAINLESS STEEL GROUND PLATES
      TO CORNER POSTS
           ↓
216 — PAINT WELDMENT
           ↓
218 — PAINT DOORS & SIDEWALLS
           ↓
220 — INSTALL FAN & ACCESS PORT COVER PLATES IN
      TOP & BASE
           ↓
222 — ASSEMBLE RACK POSTS TO MOUNTING RAILS
           ↓
224 — INSTALL SIDEWALL PANELS TO WELDMENT
           ↓
226 — INSTALL LATCHES & HINGES TO DOORS
           ↓
228 — INSTALL DOORS TO WELDMENT
```

FIG. 16

242 — FORM FIVE NOTCHES INTO EACH CORNER OF A FLAT SHEET OF METAL, EACH OF THE FIVE NOTCHES CONNECTED TO AN ADJACENT NOTCH ACROSS A RESPECTIVE CORNER TO PROVIDE EACH CORNER OF THE METAL SHEET WITH A STAIR-STEPPED SHAPED EDGE PERIPHERY

244 — BEND THE METAL SHEET APPROXIMATELY NINETY DEGREES IN FOUR PLACES TO PROVIDE FOUR FIRST BREAKS, EACH OF THE FOUR FIRST BREAKS EXTENDING PARALLEL TO ONE OF THE OTHER FIRST BREAKS AND PERPENDICULAR TO THE ADJACENT TWO OF THE OTHER FIRST BREAKS, AND EACH OF THE FIRST BREAKS EXTENDING BETWEEN THE CENTRAL NOTCHES OF THE FIVE NOTCHES OF ADJACENT ONES OF THE CORNERS TO PROVIDE SIDEWALLS;

246 — BEND THE METAL SHEET APPROXIMATELY NINETY DEGREES IN FOUR PLACES TO PROVIDE FOUR SECOND BREAKS WHICH EXTEND PARALLEL TO AND ADJACENT TO THE FIRST BREAKS, OUTWARD OF THE FIRST BREAKS, AND EXTENDING BETWEEN RESPECTIVE ONES OF ADJACENT NOTCHES TO THE CENTRAL NOTCHES OF ADJACENT ONES OF THE CORNERS TO PROVIDE FLANGES WHICH EXTEND AT APPROXIMATELY NINETY DEGREES TO THE SIDEWALLS;

248 — BEND THE METAL SHEET APPROXIMATELY NINETY DEGREES IN FOUR PLACES TO PROVIDE FOUR THIRD BREAKS WHICH EXTEND PARALLEL TO AND ADJACENT TO THE FIRST AND SECOND BREAKS, OUTWARD OF THE FIRST AND SECOND BREAKS, AND EXTENDING BETWEEN RESPECTIVE ONES OF OUTWARD NOTCHES, WHICH ARE ADJACENT TO THE ADJACENT NOTCHES TO THE CENTRAL NOTCHES, OF ADJACENT ONES OF THE CORNERS, TO PROVIDE LIPS WHICH EXTEND AT APPROXIMATELY NINETY DEGREES TO THE FLANGES.

UNIVERSAL ELECTRONICS CABINET

TECHNICAL FIELD OF THE INVENTION

This invention is related to electronics cabinets and, in particular, to electronics cabinets for holding rack mounted electronics units.

BACKGROUND OF THE INVENTION

Prior art electronics cabinets have been provided for housing electronics units, such as power panel components, modular components, electronics panels and telecommunication equipment, often using interiorly disposed racks for mounting the electronics units within the prior art electronics cabinets. Such electronics cabinets have been provided by first building a steel support frame. The support frame typically provided a rack to which the electronics units were mounted. Sheet metal enclosure panel sections were mounted to the support frame to provide an enclosure. Support frame components, and in some cases the metal enclosure panels, were often secured to the support frames with butt welds. The butt welds were disposed on the exterior portions of the panels and the support frame. The use of exterior butt welds to join the enclosure panels to the support frames required grinding of the butt welds to a smooth finish to enhance the appearance of the exterior of the cabinets. Grinding the exterior butt welds was a time consuming process, often adding many man hours to the time required to fabricate such electronics cabinets.

SUMMARY OF THE INVENTION

An electronics cabinet and method for fabricating the electronics cabinet from sections of sheet metal are disclosed. The electronics cabinet has a welded frame which comprises a top, a base and four corner posts. Side panels and door panels, which are formed of sheet metal, are mounted to the welded frame to form an enclosure. The top and the base of the electronics cabinet are each formed of respective sections of sheet metal which are each folded into a pan-like configuration. The pan-like configuration of the top and the base includes a flat central portion, sidewalls which extend substantially around the periphery of the central portion, flanges which extend around edges of the periphery of the sidewalls which are opposite the central portion, and lips which extend around edges of the periphery of the flanges which are opposite the sidewalls. Adjacent ones of the sidewalls together define respective corners for the top and the base. The top and the base are substantially the same size, and each have a width, a depth and a height. Preferably the depths of the top and the base are longer than the widths, and the heights of the top and the base are defined by the height of the sidewalls and the lips.

Four posts are formed of respective sections of sheet metal. The sections of sheet metal are formed to define two sides for each of the four corner posts, with the sides extending for the lengths of the respective posts. One of the two sides is shorter than the other to define a short side and a long side for each post. Post flanges are formed along the edges of each of the two sides, on lateral edges which are opposite that of an adjoining side. Post lips are formed on the edges of each of the post flanges, on lateral sides which are opposite that of the sides. The four posts are aligned to extend between respective corners of the top and the base, with the short sides of the corner posts aligned to extend in the direction of the widths of the top and the base, and the long sides of the corner posts aligned to extend in the direction of the depths of the top and the base. The lengths of the four posts each extend for the full height of the cabinet, with end portions of the posts overlapping and fitting flush against the outer sides of respective ones of the corners defined by the sidewalls of the top and base. The end portions of opposite ends of the posts fit flush against respective ones of the flanges and the lips of the top and base sidewalls.

The corners of the top and the base have openings which extend through the sidewalls adjacent to end portions of the posts which overlap the corners. The openings are defined by both corner slots which extend between adjacent sidewalls and apertures which extend through the sidewalls. The openings defined by the apertures through the sidewalls of the corners of the top and base are then plug welded to join the end portions of the post to edge portions of the top and the base which are adjacent to the apertures. The edges of the top and the edges of the base, including the edges defined by the slots between the sidewalls of the top and the base, are fillet welded to the respective end portions of the posts.

Four mounting rails formed of angle iron have longitudinal lengths which are spaced apart and mounted in parallel to the welded frame. Two of the mounting rails are welded to the underside of the top and two of the mounting rails are welded to the topside of the base, directly beneath and parallel to the two mounting rails which are mounted to the top. Two foot plates are mounted to the underside of the base, and have longitudinal lengths which are spaced apart and which are aligned to extend perpendicular to lengths of the two mounting rails mounted to the topside of the base. Four rack posts are then mounted to the mounting rails to provide a rack structure for mounting electronics units in the cabinet. Side metal panels, and front and rear door panels are then mounted to the four corner posts to enclose the interior of the electronics cabinet.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
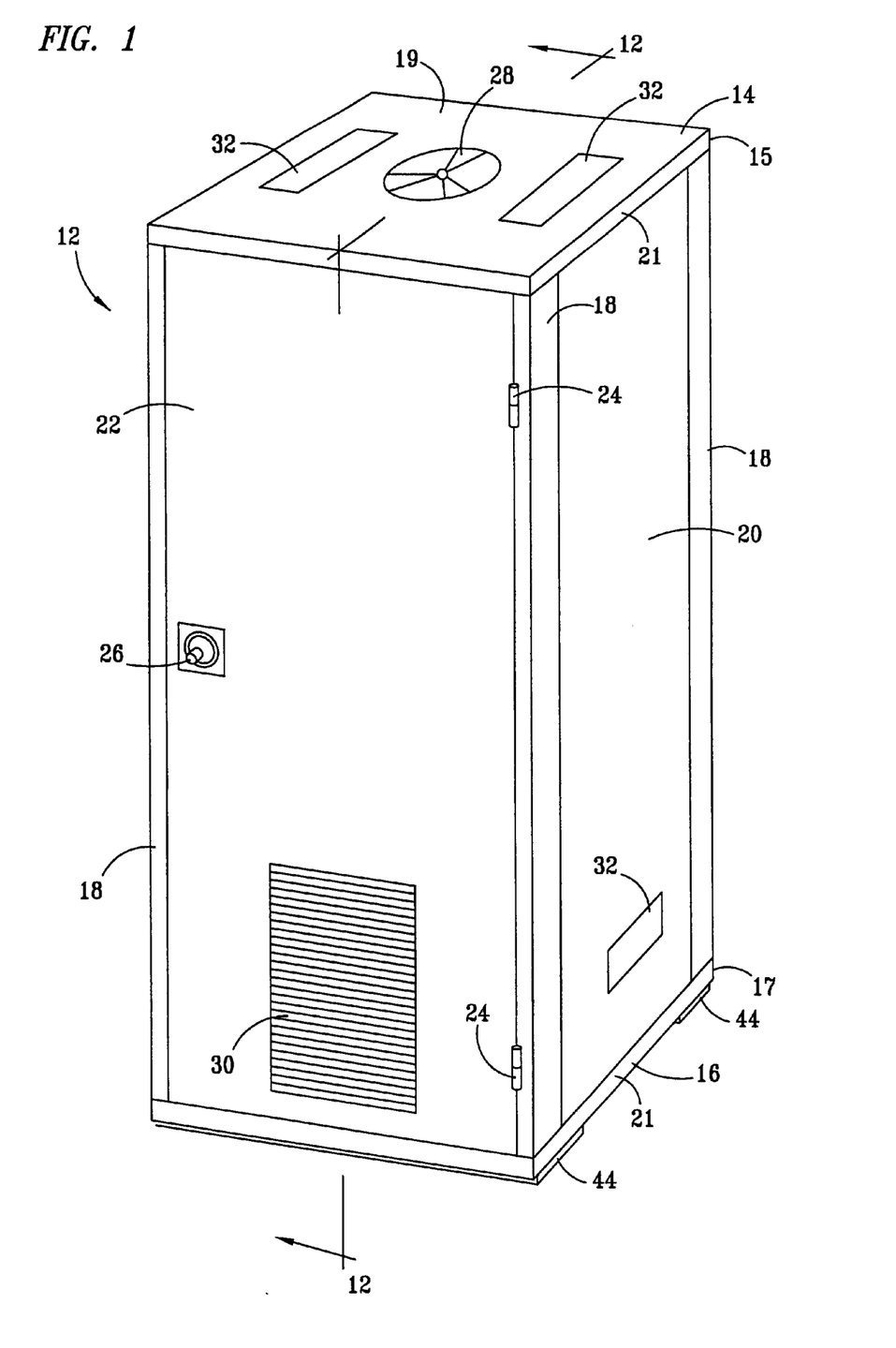
FIG. 1 is a perspective view of a universal electronics cabinet made according to the present invention.

FIG. 1 is a perspective view of a universal electronics cabinet 12 of the present invention. The electronics cabinet 12 has a top 14, a base 16, and four corner posts 18. The corner posts extend from the corners 15 of the top 14 to respective corners 17 of the base 16. The top 14 and the base 16 are constructed in a pan-type configuration, each having a central, planer portion 19 and four side walls 21. The electronics cabinet 12 further includes two side wall panels 20, one being for the right side and the other being for the left side of the cabinet 12. Two door panels 22 are mounted to the front and rear, respectively, of the electronics cabinet 12. Two hinges 24 (one shown) pivotally mount the door panels 22 to respective ones of the corner posts 18. Door latches 26 are mounted to respective ones of the door panels 22. The door latches 26 are provided for securing the sides of the door opposite that of respective ones of the hinges 24 to the respective ones of the corner posts 18. A filter cover 30 encloses an air filter in the forward one of the door panels 22. A ventilation fan 28 is provided in the top 14. Covers 32 for access ports 48 (see FIG. 2) are mounted to the top 14.

Figure 2:
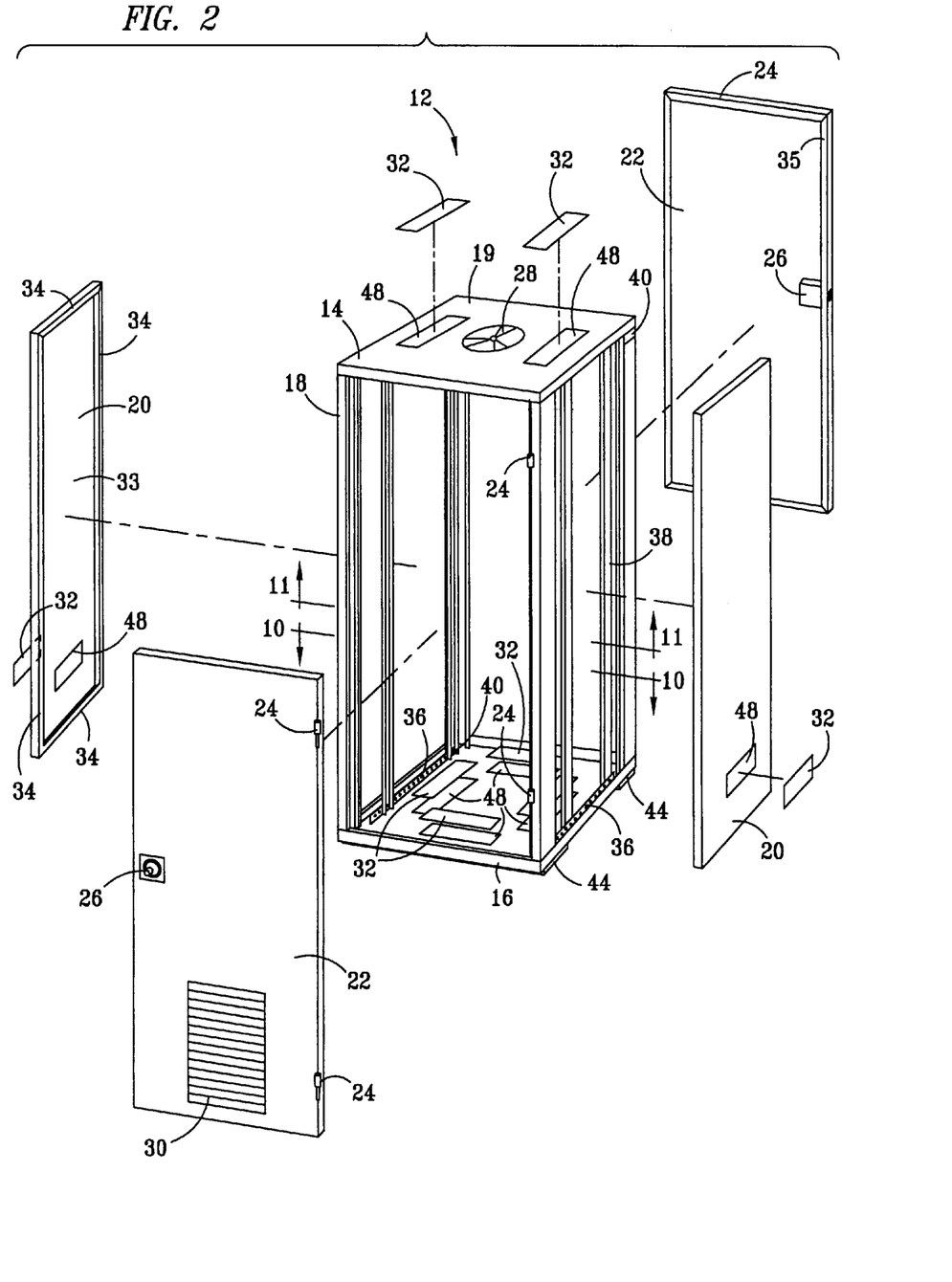
FIG. 2 is a perspective, exploded view of the universal electronics cabinet.

FIG. 2 is a perspective, exploded view of the cabinet 12, which includes a weldment 46 and two sidewall panels 34 and front and rear door panels 22. The weldment 46 includes the top 14, the base 16 and the four corner posts 18. The door panels 22 are formed of flat sheet metal and have a central planar portions 33, with flanges 34 that extend on each of the four sides of the door panels 22. The flanges 34 continuously extend around the peripheries of the central, planar portions 33 of the door panels 22. Mounted to the central, planar portion 19 of the top 14 and the central, planar portion 19 of the base 16 are four mounting rails 36. Two of the mounting rails 36 are spaced apart and mounted to the top 14, and two of the mounting rails 36 are spaced apart and mounted to the base 16. The mounting rails 36 extend in parallel, in the same relative direction as the depth of the cabinet 12. The two mounting rails 36 mounted to the underside of the top 14 extend immediately above respective ones of the two mounting rails mounted to the upperside of the base 16. The mounting rails 36 are each preferably formed of sections of angle iron having one side of the angle iron section defining a flange 35 (see FIG. 3) which is mounted flush to respective ones of the central, planar portions 19 of the top 14 and the base 16, and the other side of the angle iron defining a second flange 37 (see FIG. 3) which is disposed at ninety degrees to the first side of the angle iron. A plurality of holes 50 (see FIG. 3) are formed through the vertically disposed flanges 37 of the mounting rails 36 for mounting rack posts 38 to the mounting rails 36. Preferably, there are four rack posts 38 for mounting to the mounting rails 36. The rack posts 38 are adjustable between forward and rearward positions relative to the rack 12 for accommodating electronics units of varying depths.

Two stainless steel ground plates 40 are mounted to respective ones of the corner posts 18, and have a plurality of stainless steel studs 42 which provide electrical ground connections. Preferably, eight studs 42 extend through each of the ground plates 40 and are welded to respective ones of the plates 40 to provide electrical ground connections for connecting electrical cables of the electronics units to the framework of the electronics cabinet 12 provided by the weldment 46. Two planar foot plates 44 extend in parallel underneath the bottom of the base 16, and are welded to the underside of the base 16. The two spaced apart foot plates 44 are preferably rectangular and have lengths which extend in directions across the width of the weldment 46 of the electronics cabinet 12. The singular weldment 46 provides a frame for the electronics cabinet, and comprises the top 14, the base 16, the four corner posts 18, the four mounting rails 36, the ground plates 40, the ground studs 42 and the two spaced apart foot plates 44.

Figure 3:
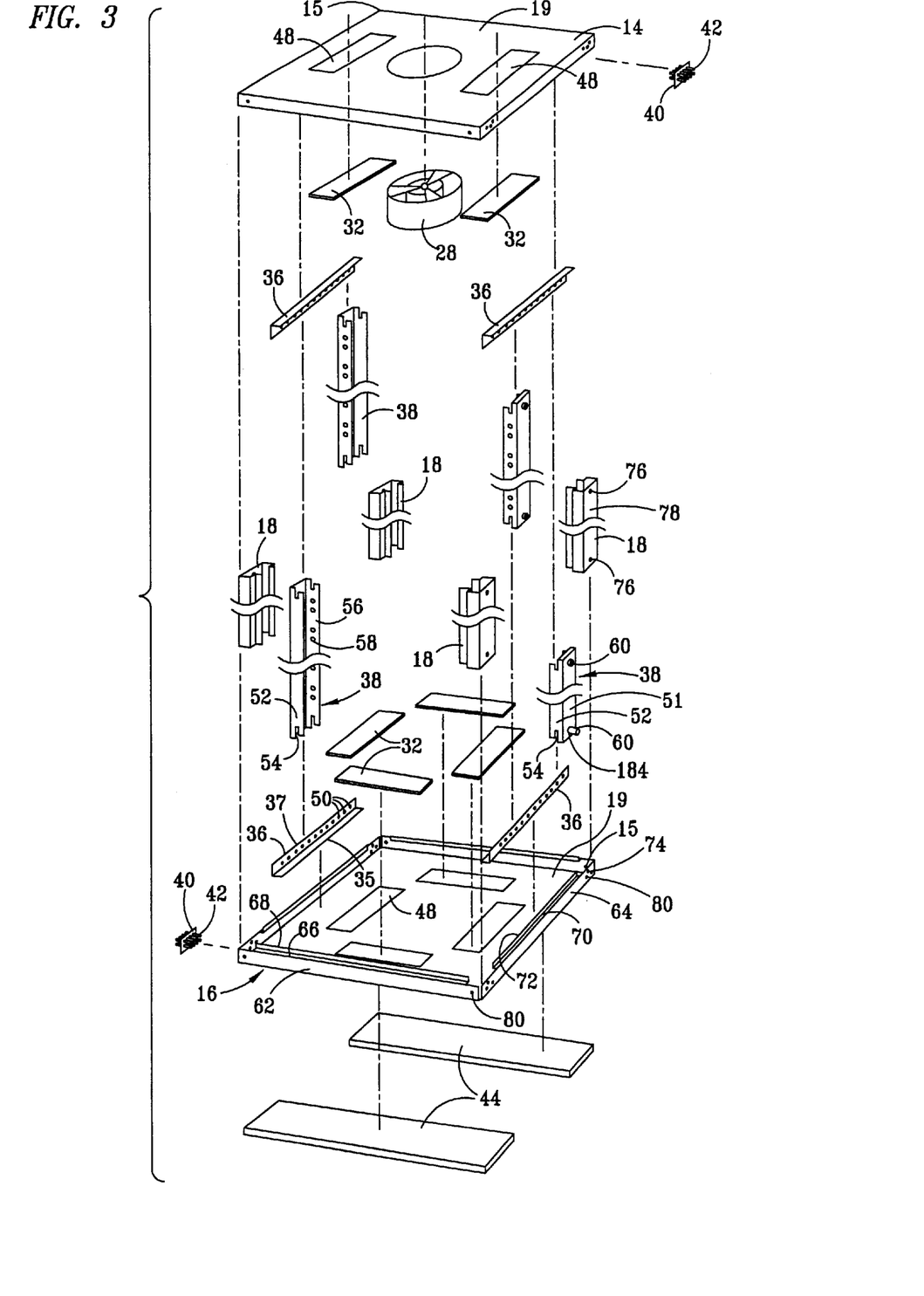
FIG. 3 is an exploded view of a weldment of the electronics cabinet.

FIG. 3 is an exploded view of the weldment 46 which provides the framework for the electronics cabinet 12, and the four rack posts 38. Access ports 48 extend through various sections of the central, planar portions 19 of the top 14 and the base 16. The holes 50 are shown extending through the vertical flanges 37 of the angle iron sections providing the four mounting rails 36. The rack posts 38 have end portions 52 which have a profile that defines a slot 54 in the terminal ends of the end portions 52. The end portions 52 of the rack posts 38 have a planar central portion 51 and two flanges 56. Spaced apart pairs of holes 58 are spaced apart over the length of the interiorly disposed ones of the flanges 56 of respective ones of the rack posts 38. A latch 60 is provided adjacent each of the opposite end portions 52 of the rack posts 38 for securing the end portions 58 of the rack posts 38 of respective ones of the mounting rails 36, with the latch 60 engaging a respective one of the holes 50 of the mounting rails 36.

The base 16 is made of sheet metal which is formed to have a pan-shape, defined by the planer central portion 19 and the sidewalls 21. The sidewalls 21 include two lateral sidewalls 62 and front and rear sidewalls 64. Each of the sidewalls 62 has a longitudinally central portion, from which a flange 66 horizontally extends from the upper end thereof. Each of the flanges 66 has a lip 68 which extends vertically upward therefrom, from the interior edges of the flanges 66. A plurality of flanges 70 extend in a horizontal direction from the upper portions of respective ones of the sidewalls 64. Lips 72 extend in vertical directions from the inwardly disposed portions of the flanges 70. Alignment holes 74 are formed through each end of the lateral sidewalls 62, proximate to the corners 15 and 17 of the top 14 and base 16. Alignment holes 76 are provided on the end portions 78 of the corner posts 18, for aligning with the alignment holes 74 to place the corner posts 18 in correct alignment with the corners 15 and 17 the top 14 and the base 16. Weld holes 80 are provided through the lateral sidewalls 62, and the front and rear sidewalls 64 of the top 14 and the base 16 for plug welding the end portions 78 of the corner posts 18 to respective ones of the corners 15 and 17 the top 14 and the base 16. The top 14 is similarly constructed to the base 16, inclusive of having the lateral sidewalls 62, the front and rear sidewalls 64, the flanges 66 and the lips 68, except that the configuration for the holes 48 through the central, planar portion 19 of the top 14 is not the same as that for the holes 48 of the central, planer portion 19 of the base 16.

Figures 4, 5, 6, 7:
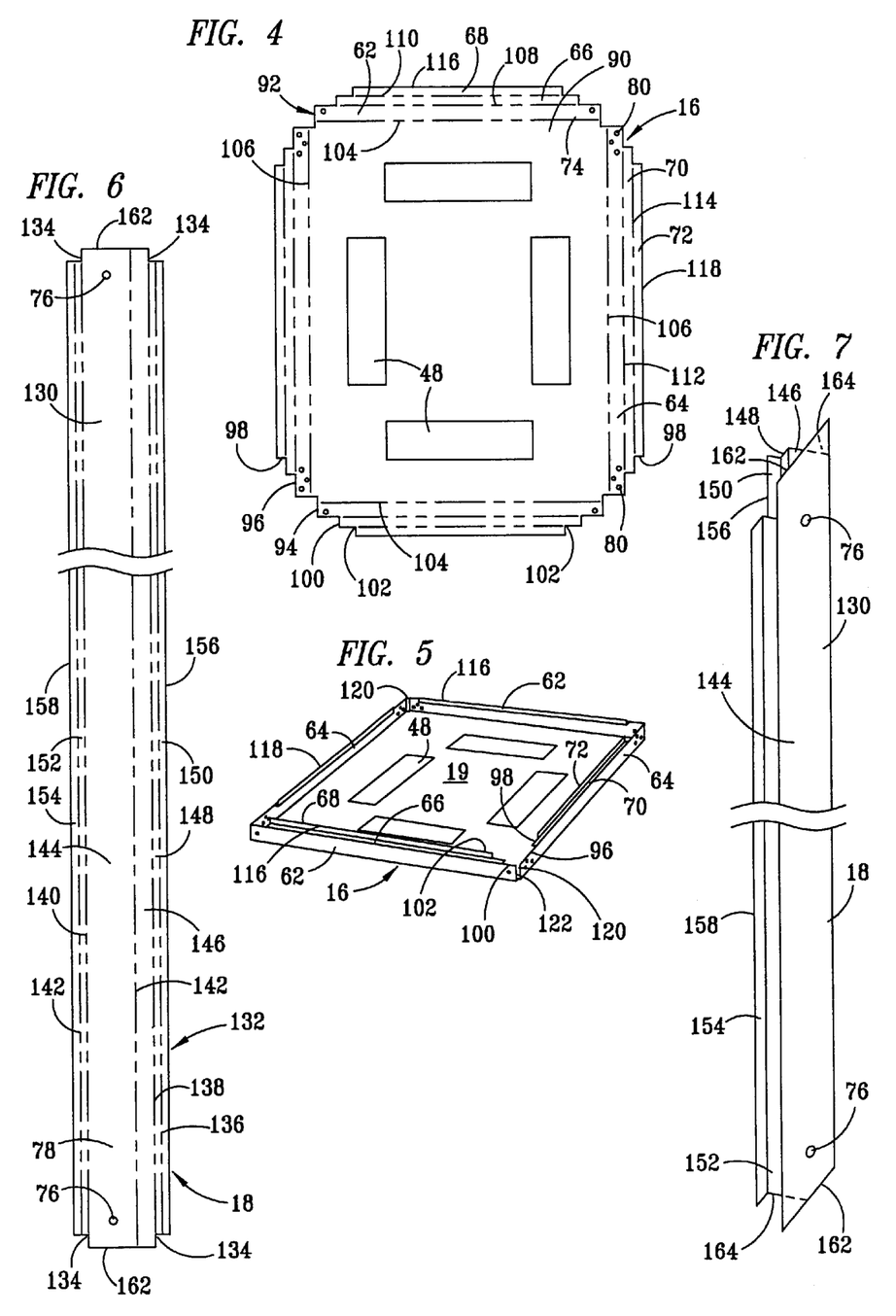
FIG. 4 is a flat pattern view of a flat section of sheet metal from which the base of the weldment of the electronics cabinet is formed, showing break lines for forming the base.
FIG. 5 is a perspective view of the base of the weldment of the electronics cabinet after forming the flat section of sheet metal of FIG. 4.
FIG. 6 is a flat pattern view of a flat piece of sheet metal from which one of the corner posts of the weldment of the electronics cabinet is formed, showing the break lines for forming the corner post.
FIG. 7 is a perspective view of one of the corner posts of the weldment of the electronics cabinet after being formed from the flat piece of sheet metal of FIG. 6.

FIG. 4 is a flat pattern view of a flat section of sheet metal 90 from which the base 16 is formed. The section of sheet metal 90 has a peripheral edge 92 defining a periphery which includes notches 94, notches 96, notches 98, notches 100 and notches 102, which are formed in each of the four corners of the section of sheet metal 90. The section of sheet metal 90 is preferably rectangular in shape. Break lines 104, 106, 108, 110, 112 and 114 show where the sheet metal 90 is bent at ninety degree angles to form the shape of the base 16 shown in FIG. 5.

FIG. 5 is a perspective view of the base 16 of the cabinet 12, after the base 16 is formed from the sheet metal 90. The sidewalls 62 and 64 are formed when bent upward from the central, planar portion 19 of the base 16, such that a gap 120 extends between adjacent ones of the sidewalls 62 and 64. Adjacent ones of the edges 122 of the sidewalls 62 and 64 are spaced apart to provide a slot, or gap 120, and are welded to the lower portions of the corner post 18 by fillet welding. The edges 116 and 118 of the section of sheet metal 90 define rims of respective ones of the sidewalls 62 and 64 of the base 16.

FIG. 6 is a flat pattern view of a flat piece of sheet metal 130 from which one of the corner posts 18 is formed. The sheet metal 130 has a periphery 132 into which four notches 134 are formed into respective ones of the four corners of the elongated rectangular sheet metal plate 130. Vertically extending break lines 136, 138, 140 and 142 are shown to depict where the planar sheet metal plate 130 is bent at ninety degree angles to form one of the corner posts 18.

FIG. 7 is a perspective view of one of the corner posts 18 after being formed from the flat sheet metal plate 130 of FIG. 6. The corner post 18 has a long side 144, which defines a post width, and a short side 146, which defines a post thickness. The long side 144 is disposed at a ninety degree angle to the short side 146. Preferably, the long side 144 is aligned to extend parallel to the depth of the electronics cabinet 12, that is, in forward and rearward directions relative to the electronics cabinet 12. The longer sides 144 of the corner posts 18 extend parallel to the depth of the electronic cabinet 12, rather than the shorter sides 146, in order to reduce the width of the cabinet while yet maintaining a sufficient structural integrity, or strength, to support the cabinet 12 during use, such that a narrower cabinet may be provided for housing electronics units in a space which is more compact in width than the width would be if the two sides 144 and 146 were the same length. The ratio of the post width to the post thickness, as herein defined by the ratio of the width of long side 144 to the width of the short side 146 of the corner posts 18 is two and one-half to one (2.5 to 1.0), or greater. Likewise, the short side 146 preferably extends parallel to the width of the electronics cabinet 12. Extending from one vertically extending end of the long side 144, which is opposite that of the short side 146, is a flange 152. Extending from the vertically extending end of the short side 146, which is opposite that of the long side 144, is a flange 148. Extending from the opposite ends of the flange 152 and the flange 148, from respective ones of the long side 144 and the short side 146, are vertically extending lips 154 and 150, respectively. The flat sheet metal plate 130 of FIG. 6 further has lateral side edges 156 and 158 (see FIG. 6) which define the edges of respective ones of the lips 150 and 154. The terminal ends 162 (see FIG. 6) define the top and bottom edges of the flat sheet metal plate 130 from which the corner post 18 is formed. The edges 164 are defined by the terminal ends of the flanges 146 and 152 and the lips 150 and 154.

Figure 8:
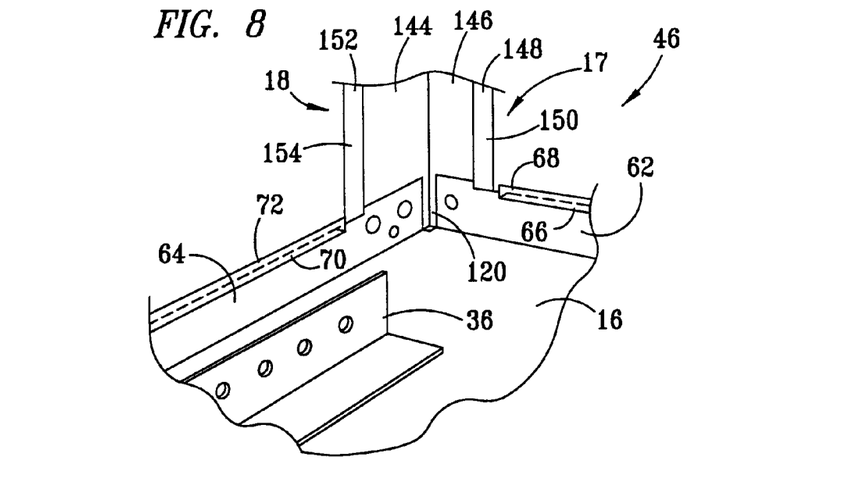
FIG. 8 is a detailed view of an interior portion of one of the lower corners of the weldment the electronics cabinet, showing a corner of the base and an end portion of one of the corner posts.

FIG. 8 is a detailed view of an interior portion of one of the corners 17 of the base 16 of the electronics cabinet 12 after being joined to an end portion 78 of one of the corner posts 18. The terminal ends of the horizontal flanges 66 and 70 of the base 16, which are defined by the two notches 100 and 96, respectively, fit flush with and at ninety degrees to the terminal ends 164 of the flanges 152 and 148, respectively. Similarly, the terminal ends 164 of the lips 150 and 154 fit flush against lateral edges of end portions of the flanges 66 and 70, respectively, which are defined by the notches 102 and 98, respectively. Lateral edges of end portions of the lips 150 and 154 extend flush against respective ones of terminal end edges of the lips 68 and 72, respectively, which are defined by the notches 102 and 98. Respective terminal ends of the lips 150 and 154 fit flush against lateral side portions of the end portions of the flanges 66 and 70, which are also defined by the notches 102 and 98, respectively. The lateral side portions of the flanges 66 and 70 are herein defined as those being adjacent to the terminal ends of the flanges 66 and 70.

Figure 9:
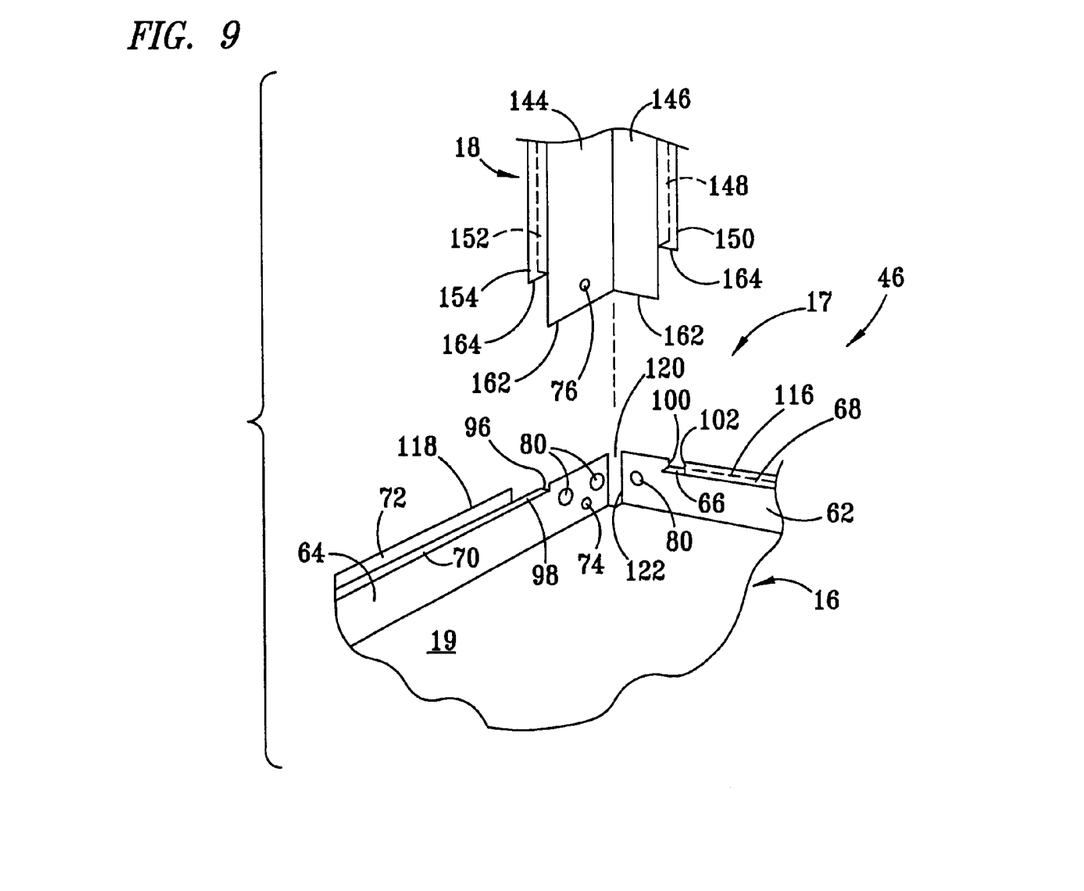
FIG. 9 is an exploded view of a corner of the weldment of FIG. 8.

FIG. 9 is an exploded view of the interior portion of one of the lower corners 17 of the weldment 46, showing the corner post 18 prior to being fitted against the various portions of the sidewalls 62 and 64 of the base 16, as shown in FIG. 8. The alignment holes 74 and 76 are provided in respective ones of the base 16 and the corner post 18. The weld holes 80 are provided through the end portions of the sidewalls 62 and 64 of the base 16 for plug welding to central portions of the sidewalls 144 and 146 of the corner post 18. Two weld holes 80 are provided in the sidewalls 64 for disposing adjacent to the long sides 144 of the corner posts 18, and one weld hole 80 is provided the sidewalls 62 for disposing adjacent to he the short sides 146 of the corner posts 18.

Figure 10:
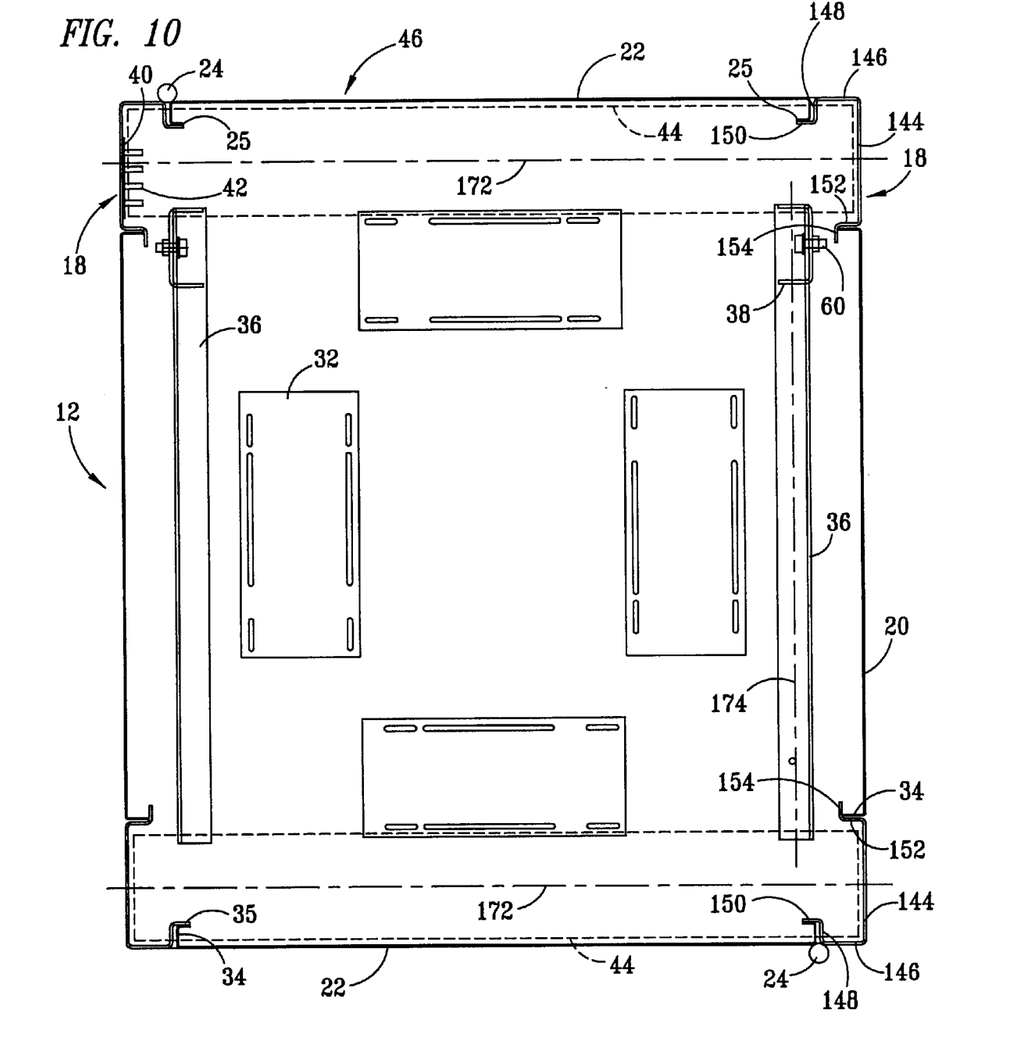
FIG. 10 is a sectional view of the electronics cabinet, as viewed along section line 10—10 in FIG. 2.

FIG. 10 is a sectional view of the weldment 46, taken along section line 10—10 of FIG. 2, and provides a top view of the base 16. The periphery of the rectangular-shaped shaped foot plates 44 extend the width of the weldment 46, having longitudinal axes 172 which extend perpendicular to the depth of the cabinet 12, and parallel to the width of the cabinet 12. The mounting rails 36 and the foot plates 44 are welded to the base 16, with the mounting rails 36 mounted to the top of the base 16 and the foot plates 44 mounted to the underside of the base 16. The mounting rails 36 have longitudinal axes 174 which extend perpendicular to the longitudinal axes 172 of the mounting foot plates 144, which is parallel to the depth of the electronics cabinet and perpendicular to the width of the electronics cabinet 12. The mounting rails 36 are mounted to the base 16 such that longitudinal axes 174 of the mounting rails 36 are disposed transverse to the longitudinal axes 172 of the foot plates 44. Terminal end portions of the mounting rails 36 are disposed above portions of the foot plates 44, welded to opposite sides, to provide a rectangular frame section which provides additional strength and stability for the base 16, in two directions that are parallel to a horizontal plane.

The two stainless steel ground plates 40 each have eight of the stainless steel studs 42. The ground plats 40 are mounted to respective ones of two of the corner posts 18 for grounding various electronics units to the framework of the electronics cabinet 12 provided by the weldment 46. The cover plates 32 are mounted to the base 16, covering the axis ports 48. The hinges 24 extend between the door panel 22 and the corner post 18. The flanges 34 of the door panels 22 engage the flanges 148 and lips 150 of the corner post 18. The side panels 20 have flanges 34 which fit adjacent to respective ones of the flanges 152 and the lips 154 of the corner posts 18.

Figure 11:
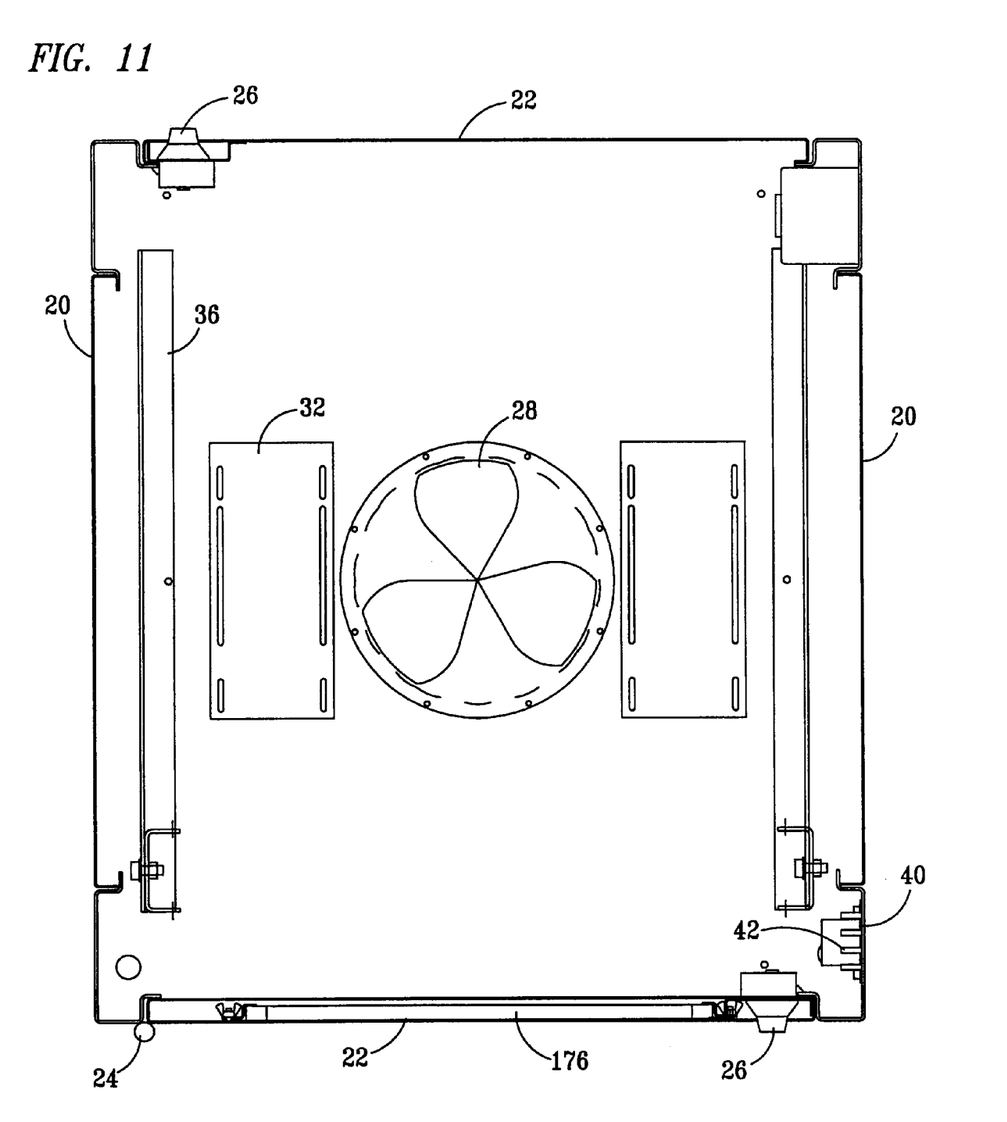
FIG. 11 is a sectional view of the electronics cabinet, taken along section line 11—11 of FIG. 2.

FIG. 11 is a sectional view of the weldment 46, taken along section line 11—11 of FIG. 2, which provides a bottom view of the top 14 and a cross-section of the upper portions of the corner posts 18. The upper two of the four mounting rails 36 are shown extending parallel to the depth of the cabinet 12, parallel to the flat central portions of the side panels 20. The doors 22 are mounted to the forward and rearward ends of the cabinet 12. A filter 146 is disposed in the forward door 122. The fan 28 is centrally disposed in a central planar portion of the top 14. An upper, stainless steel ground plate 40 is mounted to one of the corner posts 18, preferably by fillet welds. Eight threaded ground studs 42 are mounted to extend through the stainless steel ground plate 40, and are preferably welded to the ground plate 40. The door latches 26 and the hinges 24 secure the door panels 22 to the respective corner posts 18 of the weldment 14.

Figure 12A:
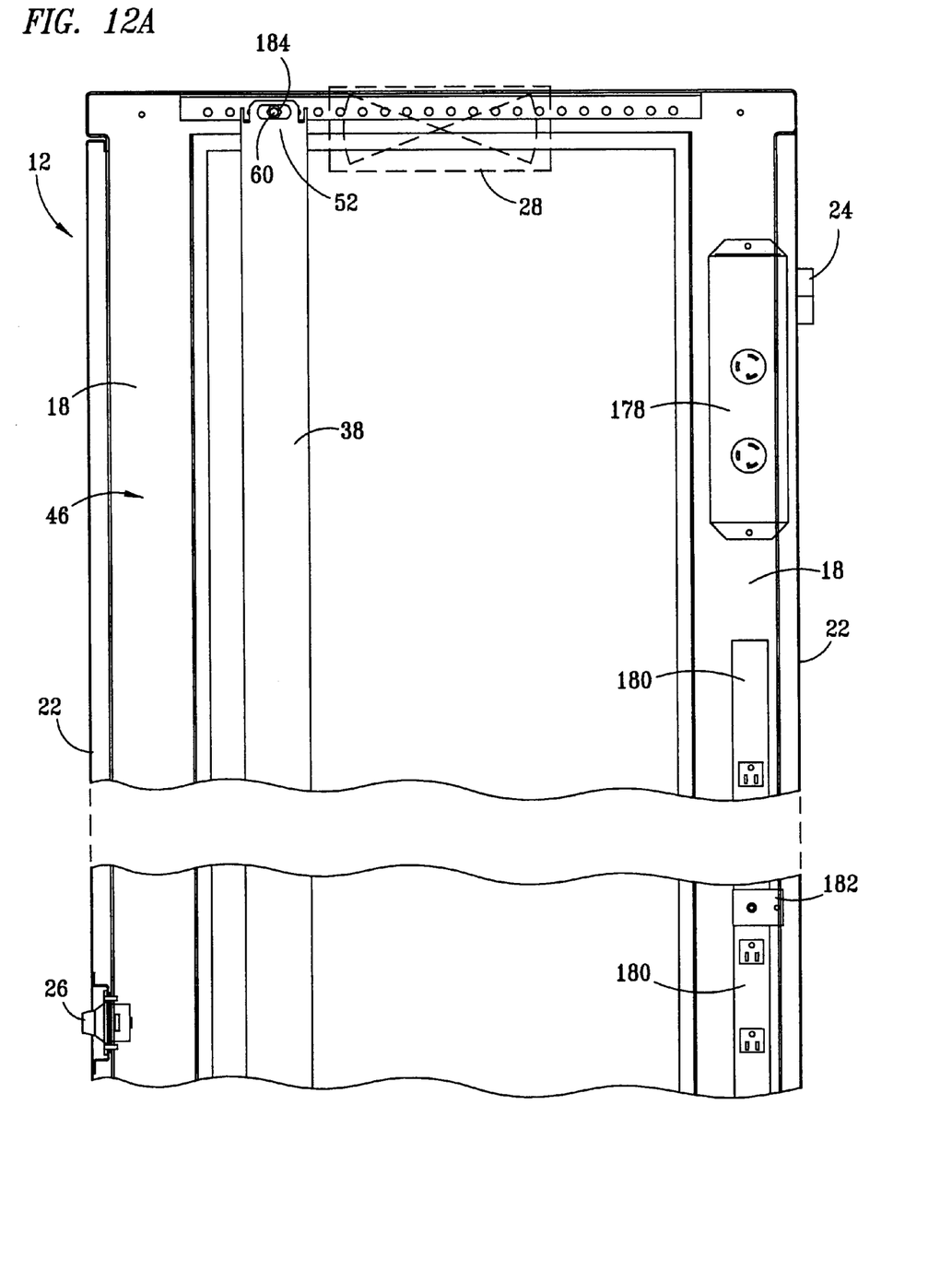
FIGS. 12A and 12B together comprise a longitudinal section view of the electronics cabinet, taken along section line 12—12 of FIG. 1.
Figure 12B:
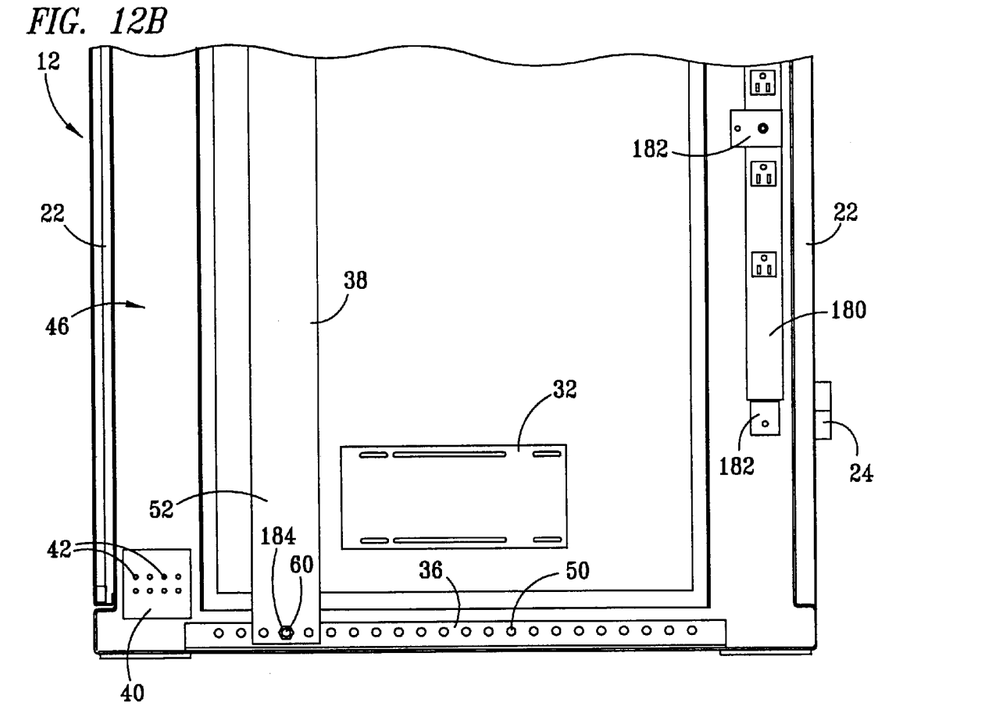

FIGS. 12A and 12B together provide a longitudinal section view of the electronics cabinet 12, taken along section line 12—12 of FIG. 1. A power unit 178 and a power strip 180 are mounted to one of the corner posts 18 beneath one of the stainless steel ground plates 40 to provide power connections for electronics units mounted within the electronics cabinet 12. Mounting brackets 182 secure the power strip 180 to the respective one of the corner posts 18 of the weldment 46. A cover plate 32 is mounted to an access port 48 of one of the sidewalls 20. The latch 60 is shown securing the opposite end portions 52 of the rack post 38 to a respective one of the mounting rails 36, passing through a mounting hole 50 in the rack post 38 and one of the holes 50 of the mounting rails 36 to secure the rack post 38 in a fixed relation to the mounting rail 36.

Figure 13:
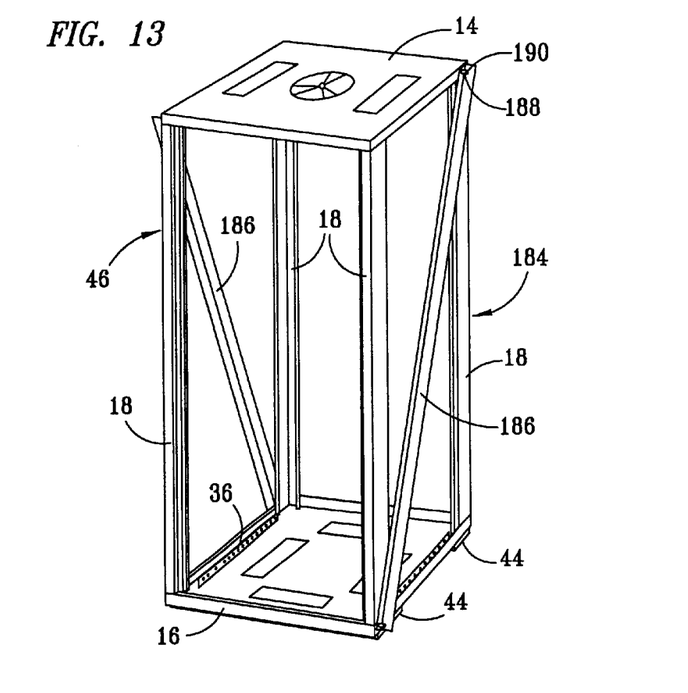
FIG. 13 is perspective view of the weldment of the electronics cabinet, with an assembly jig used for fixturing the various components of the electronics cabinet.

FIG. 13 is an assembly view showing the weldment 46 of the cabinet 12 during assembly. An assembly jig 186 provides as a fixturing component which is used to align and secure the corner posts 18 to the top 14 and base 16. Preferably, the top 14, the base 16 and the corner posts 18 are first fabricated, being stamped and formed of flat sheet metal plate. The mounting rails 36 and the foot plates 44 are typically formed of heavier gauge sheet metal than the top 14, the base 16 and the corner posts 18. Then, the corner posts 18 are aligned with respective ones of the top 14 and the base 16, in the configurations shown in FIGS. 8, 9 and 13. The assembly jigs 186 are fastened on each side of the framework components which are assembled to provide the weldment 46, with alignment holes 188 of the fixturing jig 186 being aligned with the alignment holes 74 and 76 of respective ones of the top 14, the base 16 and the corner posts 18. Fasteners 190 are then inserted through respective ones of the alignment holes 188, 80, and 76 to retain the top 13, the base 16, the ends of the corner post 18 and the ends of the assembly jigs 186 in fixed relative positions.

The framework is then welded to form the weldment 46. Plug welds are formed in the weld holes 80 in the sidewalls of the top 14 and the base 16 to weld the top 14 and the base 16 to central sections of the end portions 78 of the corner posts 18. Fillet welds are formed at the mating edges of the rim of the top 14 and the base 16 provided by the edges 116 and the edges 118 of the sidewalls 62 and 64 of the top 14 and the base 16, and the edges 122 which are adjacent to the gap 120. The edges 116, 118 and 122 are fillet welded to the portions of the corner post 18 which are adjacent thereto.

(See FIGS. 8 and 9). The terminal edges of the flanges 148 and 152, and the lips 150 and 154 are fillet welded to the terminal edges of the flanges 66 and 70, and the lips 68 and 72 on the interior portions of the top 14 and the base 16. The end portions of the corner posts 18 are welded to the corners of the top 14 and the base 16 by plug welds in the weld holes 80 and fillet welds are formed at the edges of the sidewalls 62 and 64 and corner posts 18. Thus, the exterior portions of the weldment 46 does not have welds, such that grinding the exterior portions of the weldment 46 is not required.

Figure 14:
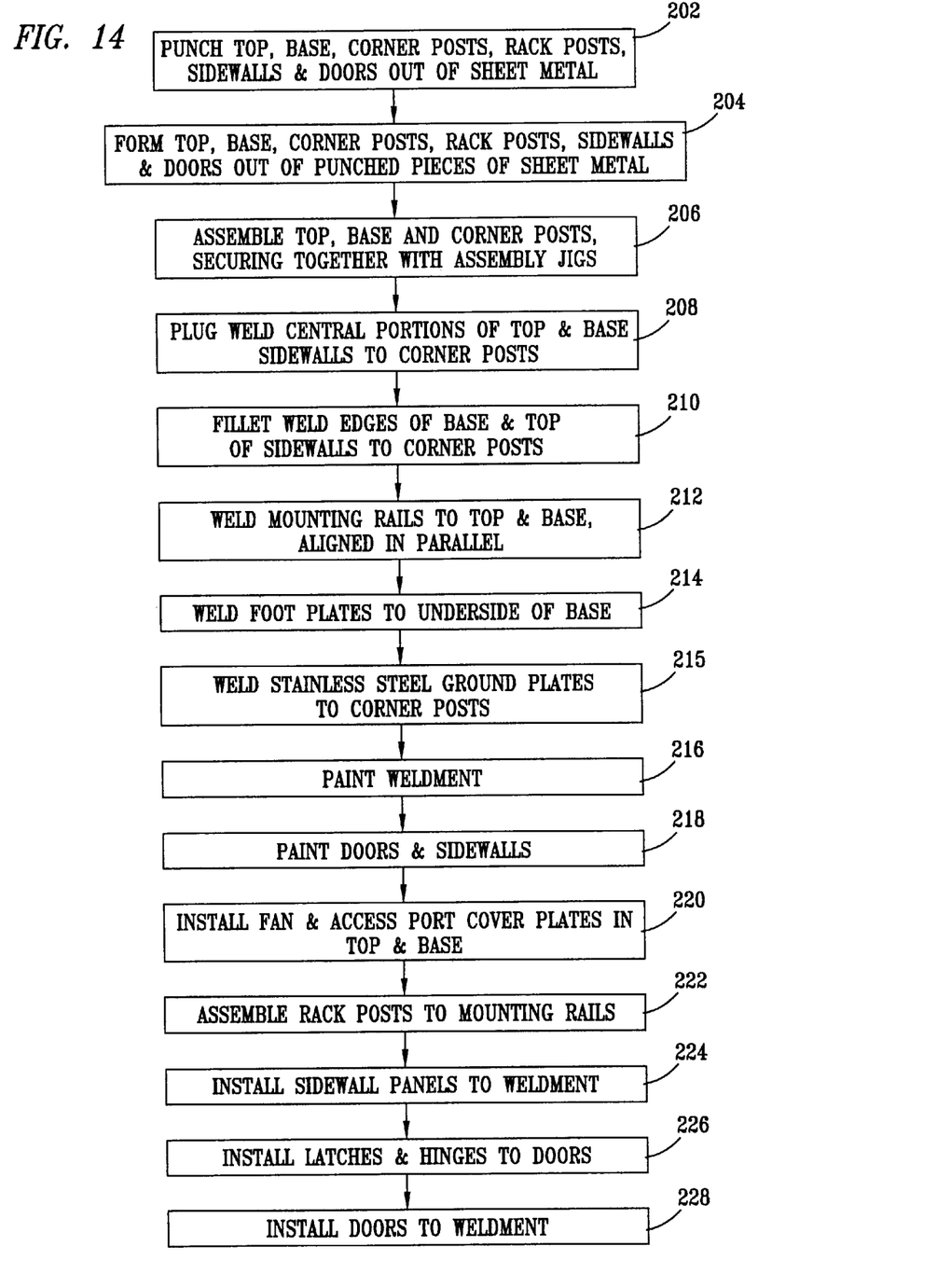
FIG. 14 is a flowchart depicting a method for fabricating the electronics cabinet.

FIG. 14 is a flowchart of a method of assembly for fabricating the electronics cabinet 12. As depicted in block 202, flat sheet metal sections 90 and 130 are punched out of sheet metal for forming into the top 14, the base 16, the corner posts 18, the rack post 38, the sidewall panels 20, the door panels 22 and the access port covers 32. Then, in the step depicted in block 204, the top 14, the base 16, the corner posts 18, the rack posts 38, the sidewall panels 20, the door panels 22 and the access port covers 32 are formed out of sections of sheet metal which are also punched in the step depicted in block 202. In the step of block 206, the top 14 and the base 16 are assembled with the corner post 18, secured together by the assembly jigs 186 and the fasteners 190. Then, in the step of block 208, the edges of the sidewalls 62 and 64 of the top 14 and the base 16 which are adjacent to the weld holes 80 are plug welded to the adjacent portions of the corner post 18. In the step of block 210, the edges 116, 118 and 122 of the top 14 and the base 16 are fillet welded to the corner posts 18. In the step of the lock 212, the mounting rails 36 are welded to the upperside of the base 16, with longitudinal axes of the mounting rails 36 extending parallel to the depth of the cabinet 12. In the step of block 214, the two foot plates 44 are welded to the bottom side of the base 16, having longitudinal axes 172 which are perpendicular to the longitudinal axes 174 of the mounting rails 36. In the step depicted in block 215, the stainless steel ground plates 40, having eight stainless steel threaded studs welded thereto, are welded to two opposite ones of the corner post 18. In step of block 216, the assembly jig 186 is removed and the weldment 46 painted. Block 218 depicts the step of painting the sidewall panels 20 and the door panels 22. In the step of block 220, the ventilation fan 28 and access port covers 32 are mounted to the top 14 and the base 16. In the step of block 222, the rack posts 38 are slidably engaged to the mounting rails 36, and then latched in place with the latches 60. In the step of block 224, the sidewall panels 20 are installed on opposite sides of the weldment 46. In the step of block 226, the door latches 26 and the hinges 24 are installed to respective ones of the door panels 22. The front one of the door panels 22 has a hole formed thereon in which an air filter and a filter cover 30 are installed. In step 228, the door panels 26 are installed to the weldment 46.

Figure 15:
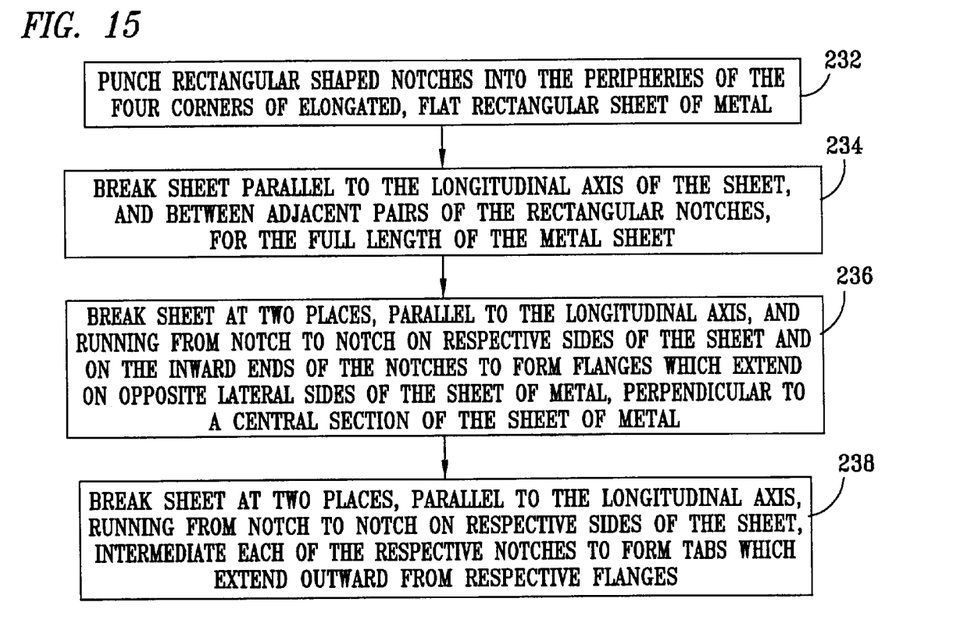
FIG. 15 is a flowchart depicting a method for forming of the corner posts of the weldment of the electronics cabinet.

FIG. 15 is a flowchart of a method for forming the corner posts 18 of the weldment 46, as shown in FIGS. 6 and 7. In the step of block 232, the rectangular shaped notches 134 are punched into the peripheries of the four corners of the elongated flat sheet metal plate 130. In the step of block 234, the sheet metal plate 130 is bent at ninety degrees to the longitudinal axes of the sheet 130, along the break line 142, between the adjacent pairs of the rectangular notches 134 and for the full length of the metal sheet 130. In the step of block 236, the sheet 130 is bent at two places to form the flanges 148 and 152, by bending the sheet 130 at ninety degrees along the break lines 138 and 140, which run parallel to the longitudinal axis of the sheet 130 and between inner end portions of pairs of the notches 134 which are disposed on opposite longitudinal ends and on the same lateral sides of the sheet 130. In the step of block 238, the sheet 130 is bent at two places to form the lips 150 and 154, by bending he sheet 130 at ninety degrees along the break lines 136 and 142, parallel to the longitudinal axis of the sheet 130 and in intermediate positions relative to pairs of the notches 134 which are disposed on the same lateral sides and opposite longitudinal ends of the sheet 130. Then, the metal sheet 130 is in the form of the configuration for the corner post 18 shown in FIG. 7.

Figure 16:
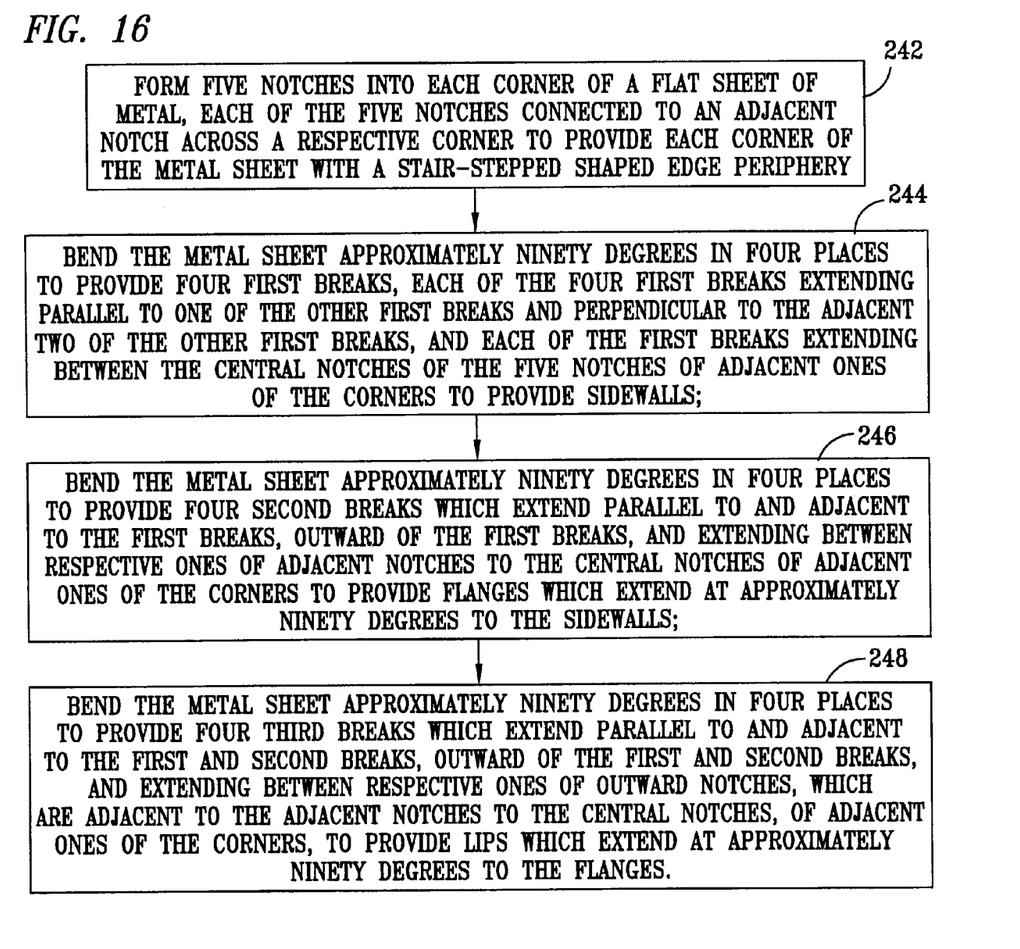
FIG. 16 is a flowchart depicting a method for fabricating one of the top and base of the electronics cabinet from a flat sheet of metal.

FIG. 16 is a flowchart depicting a method for fabricating the top 14 and the base 16 of the weldment 46 of the electronics cabinet 12 from a flat section of metal sheet 90, as shown in FIGS. 4 and 5. In the step shown in block 242, the five notches 94, 96, 98, 100 and 102 are formed into each of the four corners of the flat planar metal sheet 90 to provide a stair-shaped peripheral edge 92 for each of the four corners. Then, in the step of block 244, the metal sheet 90 is bent along four break lines 104 and 106, adjacent the corners 94, to form the sidewalls 62 and 64. In the step of block 246, the metal sheet 90 is broken at ninety degrees along a second set of four break lines 108 and 112 to form the flanges 66 and 70. In step of block 248, the metal sheet 90 is broken at ninety degrees along a third set of break lines 110 and 114 to form the lips 68 and 72, respectively.

Figure 17:
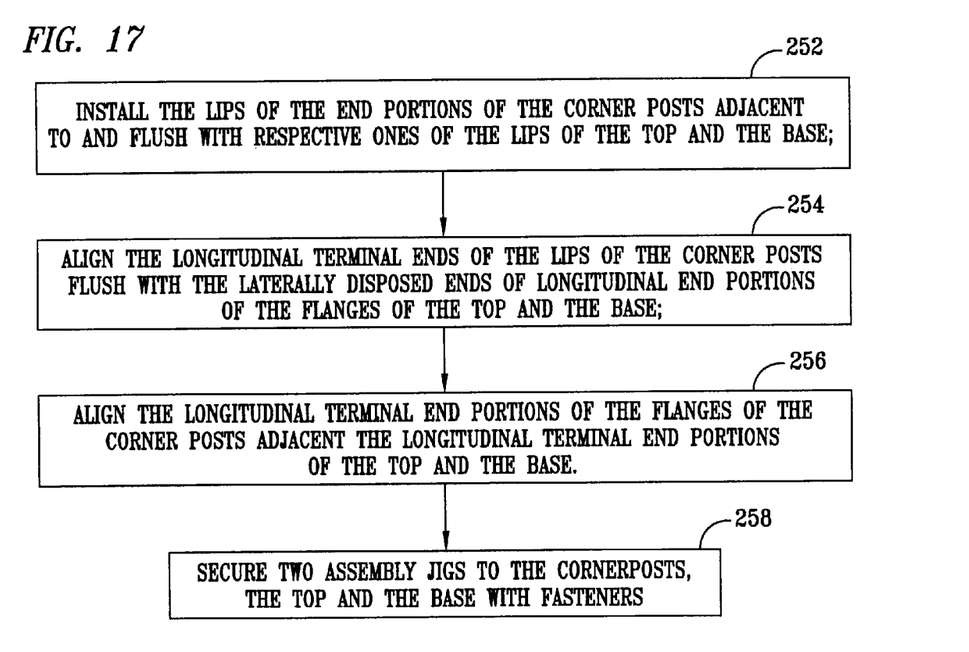
FIG. 17 is a flowchart depicting a method for assembly of the end portions of the corner post to one of the corners of one of the top and base.

FIG. 17 is a flowchart depicting a method of the assembly of one of the end portions of the corner post 18 to one of the corners 17 of a respective one of the top 14 and the base 16. First, in the step depicted in bock 252, the lips 150 and 154 of the corner post 18 are disposed adjacent to and flush with respective ones of the lips 68 and 72 of one of the top 14 and the base 16. In the step of block 254, the longitudinal terminal ends of 150 and 154 of corner post 18 are fit flush with the laterally disposed edges of the longitudinal end portions of the flanges 66 and 70 of the corresponding one of the top 14 and the base 16. Then, in the step of block 256, the longitudinal terminal end portions of the flanges 148 and 152 of the corner posts 18 are disposed adjacent to the longitudinal terminal ends of the flanges 66 and 70 of the respective one of the top 14 and the base 16. Then, in the step depicted in block 256, the post 18 is fixtured, or secured, with the assembly jigs 188 and the fasteners 190. The fasteners 190 fit through the alignment holes 74, 76 and 188 (shown in FIG. 13). The assembly is then welded to form the weldment 46.

The electronics cabinet formed according to the present invention provides several advantages over the prior art electronics cabinets. The components are stamped from flat sheet metal and then welded together only using interiorly disposed welds. Thus, there are not any exterior welds which would require grinding to provide an acceptable exterior appearance of the electronics cabinets. The mounting rails and the foot plates, provided by angle iron sections and metal plate, respectively, which are both of a heavier gage than the metal plate from which the top, the base and the corner posts are formed, are disposed at right angles to one another to provide additional strength for the framework provided by the weldment over that which would be provided by the base, the top and the corner posts alone. The top, the base, the corner posts and the other components for the weldment of the electronics cabinet are preferably formed of sheet metal. The corner posts have long sides and shorter sides, which are configured to provide sufficient structural support for a cabinet of narrower dimensions than if the sides corner posts were of the same length. A singular person can assemble the various components to first fabricate the weldment, then assemble the side panels and doors and various other components of the electronics cabinet.

Although the preferred embodiment has been described in detail, it should be understood that various changes, substitutions and alterations can be made therein without departing from the spirit and scope of the invention as defined by the appended claims.

What is claimed is:

1. An electronics cabinet having a height, a width and a depth, said cabinet comprising in combination:

a top formed of a first section of metal sheet, said top being formed into a pan-like configuration having a top central portion which defines a top of said cabinet and plurality of topsides which extend from said top central portion, transverse to said top central portion, to define top corners and top rim portions which extend adjacent to lower edges of said topsides;

a base formed of a second section of metal sheet, said base being formed into a pan-like configuration having a base central portion which defines a floor of said cabinet and a plurality of base sides which extend from said base central portion, transverse to said base central portion, to define base corners and base rim portions which extend adjacent to upper edges of said base sides;

four posts formed of respective sections of flat metal sheet, said posts having lengths which extend said height of said cabinet, with end portions of said posts overlapping and fitting flush against outer sides of respective ones of said top and base corners of said top and base sides; and said posts further having respective post sides which define post widths and post thicknesses, said post widths being at least two and one-half times wider than said post thicknesses and extending parallel to said depth of said cabinet, and said post thicknesses extending parallel to said width of said cabinet;

said top and base sides having openings formed therethrough proximate to said corners and adjacent to said end portions of said posts which overlap said top and base corners, said openings defining edge portions of said top and base sides which are adjacent to said openings;

plug welds joining said end portions of said posts and said edge portions of said top and base sides which are adjacent to said openings; and fillet welds joining said end portions of said posts and said top and base rim portions.

2. The electronics cabinet according to claim 1, further comprising two foot plates secured to a bottom-side of said base, spaced apart on opposite sides of an underside of said base central portion and having longitudinal lengths which extend parallel to said width of said cabinet.

3. The electronics cabinet according to claim 1, further comprising four mounting rails formed of angle iron, a first pair of said mounting rails secured to a top-side of said base and spaced apart on opposite sides of said base central portion, running parallel to said depth of said cabinet and transverse to said longitudinal lengths of said two foot plates, and a second pair of said mounting rails secured to a bottom-side of said top and spaced apart on opposite sides of said top central portion, running parallel to said depth of said cabinet and transverse to said width of said cabinet.

4. The electronics cabinet according to claim 3, further comprising edges of terminal ends of said posts being disposed adjacent to respective bend lines between said top and base central portions and respective ones of said top and base sides, and said edges of said terminal ends of said posts free of being joined to said bend lines of said top and said base.

5. The electronics cabinet according to claim 3, further comprising two foot plates secured to a bottom-side of said base, spaced apart on opposite sides of said base central portion and having longitudinal lengths which extend parallel to said width of said cabinet.

6. The electronics cabinet according to claim 1, further comprising said top rim portions and said base rim portions each having horizontal lips and vertical lips against which respective edges of side portions of said posts fit flush against.

7. The electronics cabinet according to claim 6, further comprising two foot plates secured to a bottom-side of said base, spaced apart on opposite sides of said base central portion and having longitudinal lengths which extend parallel to said width of said cabinet.

8. The electronics cabinet according to claim 6, further comprising edges of terminal ends of said posts being disposed adjacent to respective bend lines between said top and base central portions and respective ones of said top and base sides, and said edges of said terminal ends of said posts free of being joined to said bend lines of said top and base.

9. The electronics cabinet according to claim 8, wherein said edges of side portions of said posts are spaced apart from said edges of said terminal ends of said posts by respective lengths of said top and base sides, which extend from said bend lines to said top and base rim portions, respectively.

10. An electronics cabinet having a height, a width and a depth, said cabinet comprising in combination:

a top formed of a first section of flat metal sheet into a pan-like configuration having a top central portion which defines a top of said cabinet and four topsides which extend from said top central portion, perpendicular to said top central portion, to define top corners and top rim portions which extend adjacent to lower edges of said four topsides;

a base formed of a second section of flat metal sheet into a pan-like configuration having a base central portion which defines a floor of said cabinet and four base sides which extend from said base central portion, perpendicular to said base central portion, to define base corners and base rim portions which extend adjacent to upper edges of said four base sides;

four posts formed of respective sections of flat metal sheet, said posts having lengths which extend said height of said cabinet, with end portions of said posts overlapping and fitting flush against outer sides of respective ones of said top and base corners of said top and base sides; and said posts further having respective post sides which define post widths and post thicknesses, said post widths being at least two and one-half times wider than said post thicknesses and extending parallel to said depth of said cabinet, and said post thicknesses extending parallel to said width of said cabinet;

said top and base sides having openings formed therethrough proximate to said corners and adjacent to said end portions of said posts which overlap said top and base corners, said openings defining edge portions of said top and base sides which are adjacent to said openings;

plug welds joining said end portions of said posts and said edge portions of said top and base sides which are adjacent to said openings;

fillet welds joining said end portions of said posts and said top and base rim portions; and edges of terminal ends of said posts being disposed adjacent to respective bend lines between said top and base central portions and respective ones of said top and base sides, and said edges of said terminal ends of said posts free of being joined to said bend lines of said top and said base.

11. The electronics cabinet according to claim 10, further comprising two foot plates secured to a bottom-side of said base, spaced apart on opposite sides of said base central portion and having longitudinal lengths which extend parallel to said width of said cabinet.

12. The electronics cabinet according to claim 11, further comprising four mounting rails formed of angle iron, a first pair of said mounting rails secured to a top-side of said base and spaced apart on opposite sides of said base central portion, running parallel to said depth of said cabinet and transverse to said longitudinal lengths of said two foot plates, and a second pair of mounting rails secured to a bottom-side of said top and spaced apart on opposite sides of said top central portion, running parallel to said depth of said cabinet and transverse to said width of said cabinet.

13. The electronics cabinet according to claim 12, further comprising said top rim portions and said base rim portions which each have horizontal lips and vertical lips against which respective edges of side portions of said posts fit flush against.

14. The electronics cabinet according to claim 13, wherein said edges of side portions of said posts are spaced apart from said edges of said terminal ends of said posts by respective lengths of said top and base sides, which extend from said bend lines to said top and base rim portions, respectively.

15. A method for fabricating an electronics cabinet having a height, a width and a depth, the method comprising the steps of:

providing several sections of flat metal sheet;

forming a first of the sections of metal sheet into a pan-like configuration to provide a top having a top central portion which defines a top of the cabinet and a plurality of topsides which extend from the top central portion, perpendicular to the top central portion, to define top corners and top rim portions which extend adjacent to lower edges of four topsides;

forming a second section of metal sheet into a pan-like configuration to provide a base having a base central portion which defines a floor of the cabinet and a plurality of base sides which extend from the base central portion, perpendicular to the base central portion, to define base corners and base rim portions which extend adjacent to upper edges of the base sides;

forming openings through the topsides and the base sides, proximate to respective ones of the corners of the top and bas, the openings defining edge portions of the top and base sides which are adjacent to the openings;

forming a plurality of posts of sections of flat metal sheet of lengths which extend the height of the cabinet, and post widths and post thicknesses, the post widths being at least two and one-half times wider than the post thicknesses;

fitting the end portions of the posts flush against and outside of respective ones of the top and base corners defined by respective ones of the top and base sides, with the lengths of the posts extending from the top to the base, the openings through the top and base sides disposed adjacent to the end portions of the posts, the post widths extending parallel to the depth of the cabinet, and the post thicknesses extending parallel to the width of the cabinet;

welding the edge portions of the top and base sides which are defined by the openings to adjoining regions of respective ones of the end portions of the posts; and welding the top and base rim portions to adjacent regions of respective ones of the end portions of the posts.

16. The method according to claim 15, further comprising:

the step of fitting the end portions of the post sides against the top and base corners further including the step of disposing edges of terminal ends of the posts adjacent to respective bend lines between the top and base central portions and respective ones of the top and base sides; and maintaining the edges of the terminal ends of the posts free of being joined to the bend lines of the top and base, throughout each of the steps of the method.

17. The method according to claim 16, further comprising the steps of:

providing the top rim portions and the base rim portions each with horizontal lips and vertical lips; and disposing respective edges of side portions of the posts flush against the horizontal and vertical lips of the top and base rim portions.

18. The method according to claim 17, wherein the step of providing the top rim portions comprises spacing the top rim portions apart from the edges of the terminal ends of the posts by respective lengths of the top and base sides, which extend from the bend lines to the top and base rim portions, respectively.

19. The method according to claim 15, further comprising the steps of:

providing four mounting rails formed of angle iron;

securing a first pair of the mounting rails to a top-side of the base, spaced apart on opposite sides of the base central portion and running parallel to the depth of the cabinet and transverse to the width of the cabinet; and securing a second pair of the mounting rails to a bottom-side of the top, spaced apart on opposite sides of the top central portion and running parallel to the depth of the cabinet and transverse to the width of the cabinet.

20. The method according to claim 19, further comprising the steps of:

providing two foot plates formed of metal plate; and securing the two foot plates to a bottom-side of the base, spaced apart on opposite sides of the base central portion and having longitudinal lengths which extends parallel to the width of the cabinet and transverse to the first pair of the mounting rails secured to the top-side of the base.

21. The method according to claim 20, wherein the steps of forming each of first and second of the sections of metal sheets to provide each of the top and the base comprises the steps of:

forming five notches into each corner of a flat sheet of metal, each of the five notches connected to an adjacent notch across a respective corner to provide each corner of the metal sheet with a stair-stepped shaped edge periphery;

bending the metal sheet approximately ninety degrees in four places to provide four first breaks, each of the four first breaks extending parallel to one of the other first breaks and perpendicular to the adjacent two of the other first breaks, and each of the first breaks extending between the central notches of the five notches of adjacent ones of the corners, to provide sidewalls;

bending the metal sheet approximately ninety degrees in four places to provide four second breaks which extend parallel to and adjacent to the first breaks, outward of the first breaks, and extending between respective ones of adjacent notches to the central notches of the five notches of adjacent ones of the corners to provide lips which extend at approximately ninety degrees to the sidewalls; and bending the metal sheet approximately ninety degrees in four places to provide four third breaks which extend parallel to and adjacent to the first and second breaks, outward of the first and second breaks, and extending between respective ones of adjacent outward notches which are adjacent to the adjacent notches to the central notches of the five notches of adjacent ones of the corners to provide lips which extend at approximately ninety degrees to the lips.

22. The method according to claim 21, wherein the step of forming a plurality of posts of sections of flat metal sheet for each of the posts comprises the steps of:

punch rectangular shaped notches into the peripheries of the four corners of elongated, flat rectangular sheet of metal;

break sheet parallel to the longitudinal axis of the sheet, and between adjacent pairs of the rectangular notches, for the full length of the metal sheet;

break sheet at two places, parallel to the longitudinal axis, and running from notch to notch on respective sides of the sheet and on the inward ends of the notches to form flanges which extend on opposite lateral sides of the sheet of metal, perpendicular to a central section of the sheet of metal; and break sheet at two places, parallel to the longitudinal axis, running from notch to notch on respective sides of the sheet, intermediate each of the respective notches to form tabs which extend outward from respective flanges.

23. The method according to claim 22, wherein the step of fitting the end portions of the posts flush against and outsides of respective ones of the top and base corners comprises the steps of:

installing the lips of the end portions of the corner posts adjacent to and flush with the lips of respective ones of the lips of the top and base and the terminal edge of the flanges of the top and base;

aligning the longitudinal terminal ends of the lips of the corner posts flush with the laterally disposed terminal ends of longitudinal end portions of the flanges of the top and base; and aligning the longitudinal terminal end portions of the flanges of the corner posts adjacent the longitudinal terminal end portions of respective ones of the top and base.

* * * * *